United States Patent
Sergeev

(10) Patent No.: US 11,008,499 B2
(45) Date of Patent: May 18, 2021

(54) METHOD FOR ELIMINATING FLUID LOSS DURING CONSTRUCTION OF OIL AND GAS WELLS

(71) Applicant: LIMITED LIABILITY COMPANY "GR PETROLEUM", Moscow (RU)

(72) Inventor: Vitalii Vyacheslavovich Sergeev, Moscow (RU)

(73) Assignee: LIMITED LIABILITY COMPANY "GR PETROLEUM", Moscow (RU)

(*) Notice: Subject to any disclaimer, the term of this patent is extended or adjusted under 35 U.S.C. 154(b) by 0 days.

(21) Appl. No.: 16/761,377

(22) PCT Filed: Nov. 13, 2018

(86) PCT No.: PCT/RU2018/050141
§ 371 (c)(1),
(2) Date: May 4, 2020

(87) PCT Pub. No.: WO2019/093930
PCT Pub. Date: May 16, 2019

(65) Prior Publication Data
US 2020/0347284 A1    Nov. 5, 2020

(30) Foreign Application Priority Data
Nov. 13, 2017    (RU) ............................ RU2017139274

(51) Int. Cl.
*E21B 21/00*    (2006.01)
*C09K 8/504*    (2006.01)
*C09K 8/516*    (2006.01)

(52) U.S. Cl.
CPC ............ *C09K 8/5045* (2013.01); *C09K 8/516* (2013.01); *E21B 21/003* (2013.01); *C09K 2208/10* (2013.01)

(58) Field of Classification Search
None
See application file for complete search history.

(56) References Cited

U.S. PATENT DOCUMENTS

| 2010/0224366 A1* | 9/2010 | Lende | C04B 28/02 166/292 |
| 2014/0158354 A1* | 6/2014 | Kumar | C09K 8/08 166/293 |
| 2015/0114646 A1* | 4/2015 | Price Hoelscher | C09K 8/032 166/302 |

FOREIGN PATENT DOCUMENTS

| RU | 2139410 C1 | 10/1999 |
| RU | 2465446 C1 | 10/2012 |

(Continued)

*Primary Examiner* — Andrew Sue-Ako
(74) *Attorney, Agent, or Firm* — Nath, Goldberg & Meyer; Jerald L. Meyer

(57) ABSTRACT

The invention relates to the oil and gas industry, and more particularly to techniques for eliminating fluid loss during the drilling of oil and gas wells. The method includes successively pumping a blocking agent and a displacement fluid into a formation. The blocking agent is comprised of an emulsion-suspension system containing diesel fuel or processed oil from a central processing facility, an emulsifier, a colloidal solution of nanoparticles of silicon dioxide, dry amorphous silicon dioxide, microparticles of ilmenite or trimanganese tetraoxide, and an aqueous solution of calcium chloride or potassium chloride. The displacement fluid is comprised of an aqueous solution of calcium chloride or potassium chloride.

6 Claims, 2 Drawing Sheets

| Blocking agent composition, wt% | | | | | | Density, kg/m³ |
|---|---|---|---|---|---|---|
| Diesel fuel | Emulsifier | SiO₂ nanoparticles colloidal solution | SiO₂ dry nanoparticles | Microparticles | Calcium chloride aqueous solution | |
| 5 | 2 | 0.5 | 5 | 15 | 72.5 | 1,320 |
| 7.5 | 2 | 0.6 | 4 | 12 | 73.9 | 1,305 |
| 10 | 2 | 0.7 | 3 | 10 | 74.3 | 1,292 |
| 15 | 2.5 | 1 | 2 | 10 | 69.5 | 1,281 |
| 25 | 2.5 | 1 | 3 | 5 | 63.5 | 1,263 |
| 27.5 | 3 | 1 | 2 | 10 | 56.5 | 1,270 |
| 30 | 3 | 1 | 1 | 10 | 55 | 1,273 |

(56) References Cited

FOREIGN PATENT DOCUMENTS

SU          1714081 A1     2/1992
SU          1810490 A1     4/1993

\* cited by examiner

| No. | Special facilities and equipment | Unit | Qty | Function |
|---|---|---|---|---|
| 1 | MP with external pump and blade stirrer | piece | 1 | Preparation of blocking agent |
| 2 | Line (tubes, hoses) | piece | 2 | Filling-in and discharge of process fluids |
| 3 | Cementing unit TsA-320 or drill pump | piece | 1 | Injection of process fluids into well |
| 4 | Tank truck | piece | 2 | Transportation of process fluids |
| 5 | Process reservoir (25 $m^3$) | piece | 2 | Storage of process fluids near well |
| 6 | Measuring bar | piece | 1 | Measurement of volume of process fluids |
| 7 | Areometer | piece | 1 | Measurement of solution density |

Figure 1.

| Blocking agent composition, wt% | | | | | | Density, $kg/m^3$ |
|---|---|---|---|---|---|---|
| Diesel fuel | Emulsifier | $SiO_2$ nanoparticles colloidal solution | $SiO_2$ dry nanoparticles | Microparticles | Calcium chloride aqueous solution | |
| 5 | 2 | 0.5 | 5 | 15 | 72.5 | 1,320 |
| 7.5 | 2 | 0.6 | 4 | 12 | 73.9 | 1,305 |
| 10 | 2 | 0.7 | 3 | 10 | 74.3 | 1,292 |
| 15 | 2.5 | 1 | 2 | 10 | 69.5 | 1,281 |
| 25 | 2.5 | 1 | 3 | 5 | 63.5 | 1,263 |
| 27.5 | 3 | 1 | 2 | 10 | 56.5 | 1,270 |
| 30 | 3 | 1 | 1 | 10 | 55 | 1,273 |

Figure 2.

| Blocking agent composition, wt% | | | | | | Electrical stability, V |
|---|---|---|---|---|---|---|
| Diesel fuel | Emulsifier | SiO$_2$ nanoparticles colloidal solution | SiO$_2$ dry nanoparticles | Microparticles | Calcium chloride aqueous solution | |
| 5 | 2 | 0.5 | 5 | 15 | 72.5 | 168 |
| 7.5 | 2 | 0.6 | 4 | 12 | 73.9 | 165 |
| 10 | 2 | 0.7 | 3 | 10 | 74.3 | 170 |
| 15 | 2.5 | 1 | 2 | 10 | 69.5 | 177 |
| 25 | 2.5 | 1 | 3 | 5 | 63.5 | 175 |
| 27.5 | 3 | 1 | 2 | 10 | 56.5 | 164 |
| 30 | 3 | 1 | 1 | 10 | 55 | 158 |

Figure 3.

| Blocking agent composition, wt% | | | | | | Kinematic viscosity, mm$^2$/s |
|---|---|---|---|---|---|---|
| Diesel fuel | Emulsifier | SiO$_2$ nanoparticles colloidal solution | SiO$_2$ dry nanoparticles | Microparticles | Calcium chloride aqueous solution | |
| 5 | 2 | 0.5 | 5 | 15 | 72.5 | 16.5 |
| 7.5 | 2 | 0.6 | 4 | 12 | 73.9 | 15.6 |
| 10 | 2 | 0.7 | 3 | 10 | 74.3 | 15 |
| 15 | 2.5 | 1 | 2 | 10 | 69.5 | 13.7 |
| 25 | 2.5 | 1 | 3 | 5 | 63.5 | 11.3 |
| 27.5 | 3 | 1 | 2 | 10 | 56.5 | 10.7 |
| 30 | 3 | 1 | 1 | 10 | 55 | 9.8 |

Figure 4.

METHOD FOR ELIMINATING FLUID LOSS DURING CONSTRUCTION OF OIL AND GAS WELLS

The invention relates to the oil-and-gas producing industry, and more particularly to methods for eliminating drilling fluid loss (lost circulation control) during construction of oil and gas wells.

One of the most pressing problems in the field of construction of oil and gas wells is absorption of a drilling mud by highly permeable formations and formations having an abnormally low formation pressure (ALFP). Such geological-and-physical features of underground formations lead to complications in an operating procedure, up to a shutdown of a process of well construction.

The problem of lost circulation of conventional drilling muds becomes a particularly acute for completion of formations with ALFP. Saline solutions of different densities most widely used in the well construction processes are understood as conventional drilling muds. Elimination of drilling fluid loss in formations with ALFP cannot be effected with conventional water-based drilling muds due to their low viscosity, poor adhesion, lack of plugging capability, and hydrophilization of a rock surface during penetration into producing formations.

In order to prevent this kind of troubles, it is necessary to use special technological fluids having relatively low density, increased viscosity and adhesion properties.

The main drawbacks of all conventional water-based drilling muds are hydrophilization of rock surfaces, low viscosity, poor adhesion and lack of plugging capability, which result in uncontrollable infiltration of a drilling mud into a drilled-in formation during loss.

In this connection, the use of conventional drilling muds is inefficient when formations with abnormal conditions are drilled in. In processes of well construction, while drilling in intervals with abnormal conditions, it is necessary to apply special technological fluids—blocking compositions (blocking agents). Physical and chemical properties of blocking compositions are significantly different from those of conventional drilling muds.

An extent of manifestation of the factors that complicate the processes of well construction depends on geological conditions of a deposit and geological-and-physical parameters of formations.

The complicating factors are most frequently manifested under following conditions:
while drilling wells in areas of formations with a formation pressure lower than a hydrostatic pressure (in these conditions an uncontrollable lost circulation in great volumes takes place which results in hydrophilization of rock surfaces, extension of a well construction period, extra costs and shutdown of the drilling process);
while drilling wells in areas of formations with a formation pressure increased relative to hydrostatic pressure (application of heavy water-based drilling muds cannot ensure pressure stabilization in a formation-well system, and hydrophilization of rock surfaces occurs during overbalance).

In order to increase efficiency of construction processes of oil and gas wells and solve the task of eliminating complications during drilling in formations with abnormal conditions, it is necessary to apply process fluids having special rheological, surface-active and plugging properties.

A method for preventing and controlling lost circulation in a well is known in the art (USSR Inventor's Certificate No. 1714081, IPC E21B 33/13, E21B 33/138, publication date 23 Feb. 1992), comprising successively injecting an aqueous solution of a polyvalent metal salt and a polymeric plugging material and their subsequent displacement into a lost-circulation formation. A disadvantage of this method is the necessity of saturating an absorbing interval with aqueous solutions of polyvalent metal salts for provoking a subsequent reaction between an aqueous solution and a polymeric material (e.g. a carbamide resin mixture) that is pumped in immediately after. In lost circulation conditions, an aqueous solution of salts, due to its low viscosity, will be completely absorbed by an absorbing interval and infiltrated into the formation. In these conditions, a polymeric material, pumped in immediately after, having viscosity higher than that of the aqueous solution of salts will not mix with the aqueous solution of salts, and, correspondingly, a mixture will not acquire rheological properties required for creating a blocking screen.

A method for eliminating fluid loss during drilling and operating wells is known in the art (USSR Inventor's Certificate No. 1810490, IPC E21B 33/138, publication date 23 Apr. 1993), comprising successively injecting diesel and oil alkaline refinery waste, a spacer fluid or a flushing liquid and an aqueous solution of calcium chloride or magnesium chloride, following by their displacement with water or a flushing liquid. Water or a flushing mud solution is used as the spacer fluid or displacement fluid. Depending on a loss level, a volume of injected batches is changed. Disadvantages of this method include the impossibility of adjusting rheological parameters of the main blocking agent, i.e. diesel and oil alkaline refinery waste, as well as the absence of solid particles in the composition. In this connection, this method will be inefficient for lost circulation control in highly permeable formation intervals.

A method for isolating lost circulation zones in wells, which is directed to raising efficiency of blocking lost circulation zones, is known in the art (Patent RU 2139410, IPC E21B 33/138, publication date 10 Oct. 1999). This method comprises injecting a blocking composition and a displacement fluid, at least two compositions being injected simultaneously to form a non-Newtonian high-viscous disperse system in the process of their mixing and moving along a well bore. Disadvantages of this method include the lack of possibility of adjusting rheological parameters of two compositions injected successively as well as the impossibility of controlling and regulating the process of mixing compositions during their movement along a flow string.

A method for producing oil in porous fractured reservoirs is known in the art (Patent RU 2465446, IPC E21B 43/22, E21B 43/32, publication date 27 Oct. 2012), which reduces well product water content and which may be used, in particular, for eliminating fluid loss in the process of construction and repair of wells. Disadvantages of this method include a multicomponent form and complexity of preparing a blocking composition under field conditions, as well as irreversible clogging of filtration channels during primary drilling-in of oil-and-gas bearing formations.

In order to solve the above problems in the field of construction of oil and gas wells, a method for eliminating drilling fluid loss in highly permeable formations or formations with ALFP is provided, which is based on injecting a blocking agent in the form of an emulsion-suspension system into a formation and displacing it with an aqueous solution of calcium chloride or potassium chloride.

The essence of the invention consists in that the method comprises the following successive steps: injection of a blocking agent and a displacement fluid into a formation;

where an emulsion-suspension system, which comprises diesel fuel or treated oil from a processing facility, an emulsifier, a colloidal solution of nanoparticles of silicon dioxide, dry amorphous silicon dioxide, microparticles of ilmenite or trimanganese tetraoxide, an aqueous solution of calcium chloride or potassium chloride is used as the blocking agent; and an aqueous solution of calcium chloride or potassium chloride is used as the displacement fluid. Further, for eliminating drilling fluid loss in formations with loss intensity up to 20 m$^3$/h (partial loss), inclusively, an emulsion-suspension system can be used as a blocking agent that comprises (wt %): diesel fuel or treated oil from a processing facility—15-30, an emulsifier—2-3, a colloidal solution of nanoparticles of silicon dioxide having a size from 5 to 100 nm—0.5-1, a dry amorphous silicon dioxide (92-99%) having a particle size from 5 to 500 nm—1-3, ilmenite or trimanganese tetraoxide microparticles having a particle size from 0.2 to 5—5-10 and an aqueous solution of calcium chloride or potassium chloride—the rest. In order to eliminate drilling fluid loss in formations with loss intensity more than 20 m$^3$/h (no returns or disastrous lost circulation) an emulsion-suspension system can be used as a blocking agent that comprises (wt %): diesel fuel or treated oil from a processing facility—5-15, an emulsifier—2-3, a colloidal solution of nanoparticles of silicon dioxide having a particle size from 5 to 100 nm—0.5-1, dry amorphous silicon dioxide (92-99%) having a particle size from 5 to 500 nm—3-5, ilmenite or trimanganese tetraoxide microparticles having a particle size from 0.2 to 5—5-10 and an aqueous solution of calcium chloride or potassium chloride—the rest. As the colloidal solution of the nanoparticles of silicon dioxide, a composition may be used that comprises (wt %): silicon dioxide—31-32.5 in propylene glycol monomethyl ether—67-69, water—the rest; or silicon dioxide—30-31 in isopropanol—67-69 and methyl alcohol—the rest; or silicon dioxide—29-31 in ethylene glycol—the rest. As the emulsifier, a composition may be used that comprises (wt %): ethers of higher unsaturated fatty acids (linoleic, oleic, linolenic acids) and rasin acids—40-42, amine oxide—0.7-1, a high-molecular organic thermostabilizer—0.5-1, diesel fuel (summer or winter)—the rest.

Radial arrangement of the blocking agent in a lost circulation formation, that forms a basis of the method, ensures formation of a blocking screen that, owing to a set of high adhesion and rheological characteristics, is capable of withstanding a high pressure difference (up to 300 atmospheres) without formation fluid invasion and lost circulation.

When an emulsion-suspension system (ESS) moves in a porous medium, its effective viscosity depends on volumetric water content of the ESS and an ESS infiltration rate in a porous medium, increasing when volumetric water content becomes higher and infiltration rate becomes lower. This leads to the fact that, when an ESS moves in a porous medium, self-regulation of viscosity properties, rate and direction of infiltration into a formation takes place. These rheological properties of an ESS enable to form a radial screen that primarily blocks the most permeable formation intervals.

Increase of viscosity of the ESS when interacting with water and separation of the ESS when interacting with hydrocarbons ensure selectivity of the blocking agent action and enable to prevent irreversible clogging of a producing formation during initial drilling-in. The ESS hydrophobic behavior and surface activity ensure changes in relative permeability of mainly hydrophilic rocks of producing formations.

The technical effect of the invention consists in increased technological efficiency of lost circulation control measures in highly permeable formations or formations with ALFP; simplification of preparing a blocking composition under field conditions; the possibility of adjusting rheological parameters of compositions both under on-surface conditions and during their movement in a drilling string.

The invention is illustrated by the following graphic materials.

FIG. 1 is a table presenting facilities and equipment for preparation and injection of process fluids.

FIG. 2 is a table illustrating density measurements of emulsion-suspension systems (density of water component is 1,280 kg/m$^3$).

FIG. 3 is a table illustrating measurements of aggregative stability of emulsion-suspension systems (density of water component is 1,280 kg/m$^3$).

FIG. 4 is a table illustrating measurements of kinematic viscosity of emulsion-suspension systems (density of water component is 1,280 kg/m$^3$).

Preparatory Works at a Well

At first signs of lost circulation in the process of well construction it is necessary to take the following measures:
  to estimate well injectivity in different modes of a drill pump flowrate (maximum values of data should be recorded);
  in case of a reduction in the static level it is necessary to estimate a rate of reduction of a drilling fluid in the well and a stabilization level, and to determine absorption intensity both during drilling in different modes and in static conditions;
  to take a decision on the composition of a blocking agent according to actual data obtained by monitoring the injectivity (or absorption intensity).

A volume of the blocking agent may be determined depending on absorption intensity or intake capacity of a specific interval and is within the range from 5 to 25 m$^3$ per one meter of the penetration thickness (m$^3$/m) but not less than 150% of a volume sufficient for covering the absorbing interval.

An absorbing interval intake capacity (K, m$^3$/h·MPa) may be estimated according to the following formula:

$$K = \frac{I \cdot 10^6}{9.8 \cdot TVD \cdot (ECD - S)}, \quad (1)$$

where:
  I is an absorption intensity at a certain pump flowrate, m$^3$/h;
  TVD is a true vertical depth of the well, m;
  ECD is an equivalent circulation density, kg/m$^3$;
  S is a solution specific weight, kg/m$^3$.

Preparation of a Blocking Agent

The preparation of the blocking agent (BA) is made in mixing plants: a mixing unit "MP" (a reservoir with a blade stirrer and an external centrifugal pump). The equipment required for preparing emulsion systems is shown in FIG. 1.

In order to eliminate drilling fluid loss in formations with absorption intensity up to 20 m$^3$/h (partial loss), inclusively, the reservoir for preparing the blocking agent is filled with diesel fuel or treated oil from a processing facility—15-30 wt %. Then, the centrifugal pump is started for circulation and the blade stirrer is switched on. After that, an emulsifier—2-3 wt %, a colloidal solution of nanoparticles of silicon dioxide—0.5-1 wt %, dry amorphous silicon dioxide (92-99%) having a particle size from 5 to 500 nm—1-3 wt %, ilmenite or trimanganese tetraoxide microparticles having a particle size from 0.2 to 5 μm—5-10 wt %, and an aqueous solution of calcium chloride or potassium chloride—the rest—are successively dispersed in the diesel fuel.

In order to eliminate drilling fluid loss in formations with absorption intensity more than 20 m$^3$/h (no-returns or disastrous loss), the reservoir for preparing the blocking agent is filled with diesel fuel or treated oil from a processing facility—5-15 wt %. Then, the centrifugal pump is started for circulation and the blade stirrer is switched on. After that, an emulsifier—2-3 wt %, a colloidal solution of nanoparticles of silicon dioxide—0.5-1 wt %, dry amorphous silicon dioxide (92-99%) having a particle size from 5 to 500 nm—3-5 wt %, ilmenite or trimanganese tetraoxide microparticles having a particle size from 0.2 to 5 μm—5-10 wt %, and an aqueous solution of calcium chloride or potassium chloride—the rest—are successively dispersed in the diesel fuel.

Irrespective of formation absorption intensities (more than 20 m$^3$/h or less than 20 m$^3$/h), as the colloidal solution of nanoparticles of silicon dioxide a composition may be used that comprises (wt %):
  silicon dioxide—31-32.5 in propylene glycol monomethyl ether—67-69, water—the rest; or
  silicon dioxide—30-31 in isopropanol—67-69 and methyl alcohol—the rest; or
  silicon dioxide—29-31 in ethylene glycol—the rest.

As the emulsifier, a composition may be used that comprises (wt %): ethers of higher unsaturated fatty acids (linoleic, oleic, linolenic acids) and resin acids—40-42, an amine oxide—0.7-1, a high-molecular organic thermostabilizer—0.5-1, diesel fuel (summer or winter)—the rest.

These components are introduced into the hydrocarbon base through an ejector with the use of a vacuum hose, or through the open top of the MP reservoir.

The process reservoirs should be equipped with blade stirrers providing continuous and uniform distribution of the agents throughout the whole volume. In order to ensure achievement and maintenance of stability of the system properties it is recommended using reversible blade stirrers.

The quality of preparation and stability properties of the systems depend on coverage of the entire volume of the reservoir with the mixing, cleanliness of the reservoirs, speed of introducing the components, and dispersion time. The use of a reservoir with "beveled" corners (shape close to cylindrical) is recommended.

Quality Control of the ESS Preparation

The control is carried out by testing the ESS sedimentation stability. The test is considered positive if after holding the ESS at a room temperature for 2 hours, a separated volume of the aqueous phase or the hydrocarbon phase does not exceed 3% of the ESS total volume.

List of Equipment and Special Facilities for Conducting Works at a Well

The number and types of special facilities are listed in FIG. 1. The calculations is made in condition that the systems are prepared in the MP. This list of the equipment and special facilities is the basic one and may include additional items, depending on the work conditions and location of the mixing plant. The blocking agent may be injected into a well with the use of drill pumps.

Process of Carrying Out the Method

Flow Chart

1. Transferring a delivery line to the MP.
2. Injecting the blocking agent into a well in a volume from 5 to 25 m$^3$/m, but at least equaling to 150% of a volume sufficient for covering an absorbing interval.
3. Displacement of the blocking agent with the aqueous solution of calcium chloride or potassium chloride in a volume sufficient for the blocking agent to exit the drill string.
4. Lifting a bottom-hole assembly (BHA) by 50 meters above the interval for placing the blocking agent.
5. Closing a blowout preventer.
6. Displacement by an aqueous solution of calcium chloride or potassium chloride in a volume equaling to at least 150% of the blocking agent volume. The displacement is carried out at a low flow rate, periodically stopping the unit and monitoring changes of pressure in the well:
  upon registration of a pressure loss after stopping the unit displacement of the injected volume of the blocking agent shall be continued;
  if, in the course of displacement of the full volume of the blocking agent at a low flowrate, pressure increase is not recorded or is insignificant, it is necessary to repeat the above operations for injecting and displacing the blocking agent;
  if a pressure in the well is stabilized, it is necessary to open the blowout preventer and resume circulation at a low flowrate;
  if circulation is total, it is necessary to slowly increase the flowrate of a flushing fluid up to the operating value;
  if solution output is partial or absent, it is necessary to repeat injection and displacement of the blocking agent.
7. Lowering the equipment to the bottom-hole for removing remnants of the blocking agent.
8. Continuing to drill.

Particular volumes of the blocking agent and a displacement fluid to be injected into a well can be calculated depending on an intensity of lost circulation or injectivity of a formation and capacity of a drilled-in absorbing interval.

Process Fluid Injection Rates

In the step of installation of the blocking agent, the process fluids shall be injected continuously at a rate preventing lowering densities of process fluids by emerging gas and oil, and at a pressure in the unit preventing from full loss of a fluid.

An injection rate of the process fluids is determined by value of a formation pressure:
  in case of a high gas-oil ratio and an abnormally high formation pressure an injection rate shall be maximum, exceeding producing capacity of a formation;
  in case of an abnormally low formation pressure, for the purposes of minimizing overburden on the producing formation and lowering volumes of absorbing an injected fluid by the formation, it is necessary to maintain a minimum injection rate (5-10 L/s).

Calculation of Required Densities of Process Fluids

A required density of process fluid may be determined on the basis of a calculation, in condition that a pressure exceeding a current formation pressure by the safety factor should be created by the column of the process fluids.

A quantity of dry potassium chloride or calcium chloride, as required for preparing a required volume of an aqueous solution having a certain density, may be calculated according to the following formula:

$$M_r = \frac{Y_r * (Y_{fg} - Y_w) * V_r * 10}{Y_r - Y_w} \quad (2)$$

where:
$M_r$ is a quantity of the reagent, namely dry potassium chloride or calcium chloride, kg;
$Y_r$ is the reagent specific weight, g/cm³;
$Y_{fg}$ is specific weights of the process fluids, g/cm³;
$Y_w$ is specific weight of process water used for preparing of the process fluids, g/cm³;
$Y_r$ is required volume of a salt aqueous solution, m³.

In a case of complete replacement of the process fluids a required density may be calculated according to the following formula:

$$\rho = \frac{P_f * (1 + SF) * 10^6}{9.81 * H} \quad (3)$$

where:
ρ is calculated density of the process fluids, kg/m³;
$P_f$ is formation pressure, MPa;
SF is a safety factor of the process fluid specific weights, as determined by the Federal norms and rules in the field of industrial safety "Safety Rules in Oil and Gas Industry" approved by Decree No. 101 of Rostechnadzor of Dec. 3, 2013;
H is a vertical distance from the wellhead to the formation top, m.

In a case of a well wherein several formations with different formation pressures are drilled in and a distance between them is more than 50 m an H value from the wellhead to the top of the formation having a higher formation pressure is used.

Laboratory Studies of ESS Physical Properties

Samples of the blocking agent with different volumetric contents of components were prepared to study the physical properties of the ESS.

As a result of the experiments, the following parameters of the systems were determined:
density;
aggregative stability;
thermal stability;
kinematic viscosity.

For the purpose of evaluating quality of the prepared ESS samples, they were held at the room temperature for at least 2 hours prior to starting the experiments.

Measuring ESS Density

The results of measuring density (picnometer method) of the emulsion-suspension systems (water component density is 1,280 kg/m³) used for eliminating drilling fluid loss are shown in FIG. 2.

Measuring ESS Aggregative Stability

Aggregative stability is the system ability to maintain an internal phase dispersity degree.

The evaluation was performed according to the index of electrical stability measurements of values of electric voltage corresponding to the moment of destruction of the ESS enclosed between the electrodes of measuring cell of the device. A FANN instrument was used in the experiments.

The results of measuring the ESS aggregative stability with the water component density of 1,280 kg/m³ are shown in FIG. 3.

Measuring ESS Thermal Stability

Thermal stability of the ESS was measured by holding samples placed in graduated, hermetically sealed cylinders in an oven with the set temperature mode of 80° C. for 24 hours. The test result was considered as positive (i.e. the sample is stable), if after 6 hours of oven control not more than 3 vol. % of the aqueous phase or the hydrocarbon phase of the ESS total volume was separated. In the result of the thermal stability experiments, it was determined that all the samples were stable for 24 hours.

Measuring ESS Kinematic Viscosity

The results of kinematic viscosity measurement (mm²/s) for the ESS with the aqueous component density of 1,280 kg/m³ are shown in FIG. 4. The measurements were taken on a VPZh-2 viscometer with the viscometer constant of 0.09764 at the temperature of 23° C. (temperature measurement error is ±0.1° C.). Prior to the experiments the ESS was stirred in a mechanical stirrer at the set rate of 1600 rpm for 20 minutes.

The results of the set of the conducted basic laboratory studies of the ESS physical properties confirm high technological properties of the compositions developed. The most important parameters are high thermal stability and aggregative stability of the systems as well as the possibility of adjusting ESS viscosity by changing the aqueous phase volume content of the system.

The examples of carrying out the method are described below.

Example 1

Carrying-out of the method for eliminating drilling fluid loss in a formation with abnormally low formation pressure and absorption intensity of 38 m³/h. Fluid loss was eliminated in one cycle.

Preparatory works were conducted at the well: the equipment was arranged for injection according to the approved scheme; tubing connections were made on the equipment, and the injection line was tested for the pressure 1.5 times exceeding the anticipated operating pressure; all safety measures were taken.

Upon completion of the preparatory works, the process operations for injecting a blocking agent were started.

In the first step, the blocking agent was injected into the formation bottomhole zone (BHZ), the blocking agent having the following composition, wt %: diesel fuel—7, an emulsifier—2 (comprising, wt %: ethers of higher unsaturated fatty acids (linolenic acid) and resin acids—41, amine oxide—0.8, a high-molecular organic thermostabilizer—0.5, diesel fuel (winter)—the rest), a colloidal solution of nanoparticles of silicon dioxide—0.7 (comprising, wt %:

silicon dioxide—30, ethylene glycol—the rest), dry nanoparticles of amorphous silicon dioxide having a particle size from 5 to 500 nm—4.5, trimanganese tetraoxide microparticles having a particle size from 0.2 to 5 μm—8, an aqueous solution of potassium chloride having density of 1,050 kg/m³—the rest; the volume was 25 m³/m. In the second step, the blocking agent and the fixing agent were displaced with an aqueous solution of potassium chloride having density of 1,020 kg/m³ and the volume of 3 m³/m.

Example 2

Carrying-out of the method for eliminating drilling fluid loss in a formation with abnormally low formation pressure and absorption intensity of 18 m³/h. Fluid loss was eliminated in one cycle.

In this and the following examples the preparatory works were conducted according to the procedure described in Example 1.

In the first step, the blocking agent was injected into the BHZ, the blocking agent having the following composition, wt %: diesel fuel—23, an emulsifier—2.5 (comprising, wt %: ethers of higher unsaturated fatty acids (linolenic acid) and resin acids—42, amine oxide—0.9, a high-molecular organic thermostabilizer—0.8, diesel fuel (winter)—the rest), a colloidal solution of nanoparticles of silicon dioxide—0.9 (comprising, wt %: silicon dioxide—30, propylene glycol monomethyl ether—69, water—the rest), dry nanoparticles of amorphous silicon dioxide having a particle size from 5 to 500 nm—2, ilmenite microparticles having a particle size from 0.2 to 5 μm—7, an aqueous solution of calcium chloride having density of 1,035 kg/m³—the rest; the volume was 6 m³/m. In the second step, the blocking agent was displaced with an aqueous solution of calcium chloride having density of 1,025 kg/m³ and the volume of 3 m³/m.

Example 3

Carrying-out of the method for eliminating drilling fluid loss in a formation with abnormally low formation pressure and absorption intensity of 16 m³/h. Fluid loss was eliminated in one cycle.

In the first step, the blocking agent was injected into the BHZ, the blocking agent having the following composition, wt %: diesel fuel—30, an emulsifier—3 (comprising, wt %: ethers of higher unsaturated fatty acids (linolenic acid) and resin acids—42, amine oxide—0.9, a high-molecular organic thermostabilizer—0.8, diesel fuel (winter)—the rest), a colloidal solution of nanoparticles of silicon dioxide—0.5 (comprising, wt %: silicon dioxide—32.5, propylene glycol monomethyl ether—67, water—the rest), dry nanoparticles of amorphous silicon dioxide having a particle size from 5 to 500 nm—1, ilmenite microparticles having a particle size from 0.2 to 5 μm—5, an aqueous solution of calcium chloride having density of 1,035 kg/m³—the rest, the volume was 5 m³/m. In the second step, the blocking agent was displaced with an aqueous solution of calcium chloride having density of 1,020 kg/m³ and the volume of 2 m³/m.

Example 4

Carrying-out of the method for eliminating drilling fluid loss in a formation with abnormally low formation pressure and absorption intensity of 42 m³/h. Fluid loss was eliminated in one cycle.

In the first step, the blocking agent was injected into the BHZ, the blocking agent having the following composition, wt %: diesel fuel—5, an emulsifier—2 (comprising, wt %: ethers of higher unsaturated fatty acids (linolenic acid) and resin acids—42, amine oxide—1, a high-molecular organic thermostabilizer—1, diesel fuel (summer)—the rest), a colloidal solution of nanoparticles of silicon dioxide—1 (comprising, wt %: silicon dioxide—31, isopropanol—68, methyl alcohol—the rest), dry nanoparticles of amorphous silicon dioxide having a particle size from 5 to 500 nm—5, ilmenite microparticles having a particle size from 0.2 to 5 μm—10, an aqueous solution of calcium chloride having density of 1,095 kg/m³—the rest, the volume was 25 m³/m. In the second step, the blocking agent was displaced with an aqueous solution of potassium chloride having density of 1,080 kg/m³ and the volume of 3 m³/m.

Example 5

Carrying-out of the method for eliminating drilling fluid loss in a formation with abnormally low formation pressure and absorption intensity of 27 m³/h. Fluid loss was eliminated in one cycle.

In the first step, the blocking agent was injected into the BHZ, the blocking agent having the following composition, wt %: diesel fuel—10, an emulsifier—3 (comprising, wt %: ethers of higher unsaturated fatty acids (oleic acid) and resin acids—42, amine oxide—0.7, a high-molecular organic thermostabilizer—0.5, diesel fuel (summer)—the rest), a colloidal solution of nanoparticles of silicon dioxide—1 (comprising, wt %: silicon dioxide—30.5, isopropanol—69, methyl alcohol—the rest), dry nanoparticles of amorphous silicon dioxide having a particle size from 5 to 500 nm—4, trimanganese tetraoxide microparticles having a particle size from 0.2 to 5 μm—8, an aqueous solution of calcium chloride having density of 1,040 kg/m³—the rest, the volume was 20 m³/m. In the second step, the blocking agent was displaced with an aqueous solution of calcium chloride having density of 1,015 kg/m³ and the volume of 6 m³/m.

Example 6

Carrying-out of the method for eliminating drilling fluid loss in a formation with abnormally low formation pressure and absorption intensity of 19.5 m³/h. Fluid loss was eliminated in one cycle.

In the first step, the blocking agent was injected into the BHZ, the blocking agent having the following composition, wt %: diesel fuel—27.5, an emulsifier—3 (comprising, wt %: ethers of higher unsaturated fatty acids (linolenic) and resin acids—42, amine oxide—0.9, a high-molecular organic thermostabilizer—0.8, diesel fuel (winter)—the rest), a colloidal solution of nanoparticles of silicon dioxide—0.5 (comprising, wt %: silicon dioxide—32.5, propylene glycol monomethyl ether—67, water—the rest), dry nanoparticles of amorphous silicon dioxide having a particle size from 5 to 500 nm—1, trimanganese tetraoxide microparticles having a particle size from 0.2 to 5 μm—5, an aqueous solution of calcium chloride having density of 1,040 kg/m³—the rest, the volume was 6.5 m³/m. In the second step, the blocking agent was displaced with an aqueous solution of calcium chloride having density of 1,030 kg/m³ and the volume of 2 m³/m.

Example 7

Carrying-out of the method for eliminating drilling fluid loss in a formation with abnormally low formation pressure and absorption intensity of 25.5 m³/h. Fluid loss was eliminated in one cycle. In the first step, the blocking agent was injected into the BHZ, the blocking agent having the following composition, wt %: diesel fuel—10, an emulsifier—2.5 (comprising, wt %: ethers of higher unsaturated fatty acids (oleic acid) and resin acids—42, amine oxide—0.7, a high-molecular organic thermostabilizer—0.5, diesel fuel (summer)—the rest), a colloidal solution of nanoparticles of silicon dioxide—1 (comprising, wt %: silicon dioxide—30.5, isopropanol—69, methyl alcohol—the rest), dry nanoparticles of amorphous silicon dioxide having a particle size from 5 to 500 nm—4, ilmenite microparticles having a particle size from 0.2 to 5 μm—9, an aqueous solution of calcium chloride having density of 1,040 kg/m³—the rest, the volume was 17 m³/m. In the second step, the blocking agent was displaced with an aqueous solution of calcium chloride having density of 1,015 kg/m³ and the volume of 4.5 m³/m.

Thus, the invention can ensure increased technological efficiency of measures aimed at eliminating drilling fluid loss in highly permeable formations or formations with ALFP, simplify preparation of a blocking composition under field conditions, provide the possibility of adjusting rheological parameters of compositions both under surface conditions and during their movement in a drilling string.

What is claimed is:

1. A method for eliminating drilling fluid loss during construction of oil and gas wells, comprising successive pumping a blocking agent and a displacement fluid into a formation, where an emulsion-suspension system is used as the blocking agent and comprises diesel fuel, an emulsifier, a colloidal solution of nanoparticles of silicon dioxide, dry amorphous silicon dioxide, microparticles of ilmenite or trimanganese tetraoxide, an aqueous solution of calcium chloride or potassium chloride; and an aqueous solution of calcium chloride or potassium chloride is used as the displacement fluid.

2. The method according to claim 1, characterized in that, in order to eliminate drilling fluid loss in formations with absorption intensity up to 20 m³/h, inclusively, an emulsion-suspension system is used as the blocking agent, said system comprising (wt %):

diesel fuel—15-30, an emulsifier—2-3, a colloidal solution of nanoparticles of silicon dioxide having a particle size from 5 to 100 nm 0.5-1, dry amorphous silicon dioxide (92-99%) having a particle size from 5 to 500 nm-1-3, ilmenite or trimanganese tetraoxide microparticles having a particle size from 0.2 to 5 μm—5-10, an aqueous solution of calcium chloride or potassium chloride—the rest.

3. The method according to claim 1, characterized in that, in order to eliminate drilling fluid loss in formations with absorption intensity more than 20 m³/h, an emulsion-suspension system is used as the blocking agent, said system comprising (wt %):

diesel fuel—5-15, an emulsifier—2-3, a colloidal solution of nanoparticles of silicon dioxide having a particle size from 5 to 100 nm—0.5-1, dry amorphous silicon dioxide (92-99%) having a particle size from 5 to 500 nm—3-5, ilmenite or trimanganese tetraoxide microparticles having a particle size from 0.2 to 5 μm—5-10, an aqueous solution of calcium chloride or potassium chloride—the rest.

4. The method according to claim 1, characterized in that a composition is used as the colloidal solution of nanoparticles of silicon dioxide, said composition comprising (wt %): silicon dioxide—31-32.5 in propylene glycol monomethyl ether—67-69, water—the rest.

5. The method according to claim 1, characterized in that a composition is used as the colloidal solution of nanoparticles of silicon dioxide, said composition comprising (wt %): silicon dioxide—30-31 in isopropanol—67-69, methyl alcohol—the rest.

6. The method according to claim 1, characterized in that a composition is used as the colloidal solution of nanoparticles of silicon dioxide, said composition comprising (wt %): silicon dioxide—29-31 in ethylene glycol—the rest.

* * * * *

UNITED STATES PATENT AND TRADEMARK OFFICE
CERTIFICATE OF CORRECTION

PATENT NO. : 11,008,499 B2
APPLICATION NO. : 16/761377
DATED : May 18, 2021
INVENTOR(S) : Vitalii Vyacheslavovich Sergeev It is certified that error appears in the above-identified patent and that said Letters Patent is hereby corrected as shown below:

In the Claims

Claim 2, Column 12, Line 3, please delete the phrase "having a particle size from 5 to 100 nm 0.5-1," and replace with "having a particle size from 5 to 100 nm -- 0.5-1,".

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*